United States Patent
Han et al.

(10) Patent No.: US 9,007,344 B2
(45) Date of Patent: Apr. 14, 2015

(54) TOUCH SCREEN PANEL AND METHOD OF MANUFACTURING THE SAME

(75) Inventors: Sang-Youn Han, Seoul (KR);
Woong-Kwon Kim, Cheonan-si (KR);
Dae-Cheol Kim, Suwon-si (KR);
Ho-Jun Lee, Anyang-si (KR);
Kyung-Ho Park, Cheonan-si (KR)

(73) Assignee: Samsung Display Co., Ltd., Yongin (KR)

( * ) Notice: Subject to any disclaimer, the term of this patent is extended or adjusted under 35 U.S.C. 154(b) by 1068 days.

(21) Appl. No.: 12/631,511

(22) Filed: Dec. 4, 2009

(65) Prior Publication Data
US 2011/0018815 A1 Jan. 27, 2011

(30) Foreign Application Priority Data
Jul. 23, 2009 (KR) .................. 10-2009-0067438

(51) Int. Cl.
*G06F 3/042* (2006.01)
*G06F 3/041* (2006.01)
(52) U.S. Cl.
CPC ...... *G06F 3/041* (2013.01); *G06F 2203/04103* (2013.01)
(58) Field of Classification Search
None
See application file for complete search history.

(56) References Cited

U.S. PATENT DOCUMENTS

| | | | |
|---|---|---|---|
| 6,400,425 B1* | 6/2002 | Kim et al. ................. | 349/40 |
| 6,583,935 B1* | 6/2003 | Saif et al. ................. | 359/582 |
| 6,919,934 B2* | 7/2005 | Ha et al. ................... | 349/43 |
| 7,259,806 B1* | 8/2007 | Lee et al. ................. | 349/43 |
| 2004/0141127 A1* | 7/2004 | Tsai et al. ................. | 349/137 |
| 2005/0083307 A1* | 4/2005 | Aufderheide et al. ..... | 345/173 |
| 2006/0139574 A1* | 6/2006 | Ralli et al. ................ | 353/20 |
| 2007/0063993 A1* | 3/2007 | Shishido ................... | 345/175 |
| 2008/0074401 A1* | 3/2008 | Chung et al. ............. | 345/175 |
| 2009/0148691 A1* | 6/2009 | Lee et al. ................. | 428/328 |
| 2010/0149116 A1* | 6/2010 | Yang et al. ............... | 345/173 |

FOREIGN PATENT DOCUMENTS

| | | |
|---|---|---|
| JP | 10-171599 | 6/1998 |
| JP | 2008-083491 | 4/2008 |
| KR | 10-2008-0028270 | 3/2008 |

* cited by examiner

*Primary Examiner* — Christopher R Lamb
(74) *Attorney, Agent, or Firm* — H.C. Park & Associates, PLC

(57) ABSTRACT

Provided are a touch screen panel and a method of manufacturing the same. The touch screen panel comprises: a substrate; a first reflection-preventing film formed on the substrate; a first gate wiring formed on the first reflection-preventing film; and a sensing wiring formed above the first gate wiring to be insulated from the first gate wiring and to cross the first gate wiring.

12 Claims, 10 Drawing Sheets

TOUCH SCREEN PANEL AND METHOD OF MANUFACTURING THE SAME

CROSS REFERENCE TO RELATED APPLICATION

This application claims priority from and the benefit of Korean Patent Application No. 10-2009-0067438, filed on Jul. 23, 2009, which is hereby incorporated by reference for all purposes as if fully set forth herein.

BACKGROUND OF THE INVENTION

1. Field of the Invention

Exemplary embodiments of the present invention relate to a touch screen panel and a method of manufacturing the same.

2. Discussion of the Background

Touch screen panels are devices that are touched with a finger or a pen to input data. Touch screen panels are divided into resistive touch screen panels, capacitive touch screen panels, optical sensor touch screen panels, and the like, according to the operation principle thereof.

Resistive touch screen panels use the contact between electrodes caused by a pressure equal to or greater than a threshold pressure applied thereon. Capacitive touch screen panels use a change in capacitance that occurs when a finger touches the capacitive touch screen panels.

Resistive touch screen panels and capacitive touch screen panels each comprise a separate touch panel in addition to a conventional display panel that has an upper substrate and a lower substrate. However, this structure deteriorates overall optical characteristics and increases the thickness of display devices.

Therefore, touch screen panels having optical sensors formed in a display panel are being developed. However, when optical sensors are formed on an upper substrate of a display panel, external light is reflected by the optical sensors, switching thin-film transistors, which are connected to the optical sensors and transmit detection signals to a sensing wiring, and metal wiring, which is used for the optical sensors and the switching thin-film transistors. As a result, optical characteristics deteriorate in a bright room. For example, a contrast ratio is reduced.

SUMMARY OF THE INVENTION

Exemplary embodiments of the present invention provide a touch screen panel which reduces the reflection of external light in a bright room and thus has improved optical characteristics.

Exemplary embodiments of the present invention also provide a method of is manufacturing a touch screen panel which reduces the reflection of external light in a bright room and thus has improved optical characteristics.

Additional features of the invention will be set forth in the description which follows, and in part will be apparent from the description, or may be learned by practice of the invention.

An exemplary embodiment of the present invention discloses a touch screen panel comprising a substrate. A first reflection-preventing film is formed on the substrate. A first gate wiring is formed on the first reflection-preventing film. A sensing wiring is formed above the first gate wiring to be insulated from the first gate wiring and to cross the first gate wiring.

An exemplary embodiment of the present invention also discloses a method of manufacturing a touch screen panel. The method comprises: forming a first reflection-preventing film on a substrate; forming a first gate wiring on the first reflection-preventing film; forming a sensing wiring above the first gate wiring to be insulated from the first gate wiring and to cross the first gate wiring; and forming a second gate wiring above the sensing wiring to extend parallel to the sensing wiring, to be insulated from the first gate wiring, and to cross the first gate wiring.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, is illustrate embodiments of the invention, and together with the description serve to explain the principles of the invention.

DETAILED DESCRIPTION OF THE ILLUSTRATED EMBODIMENTS

Figure 1:
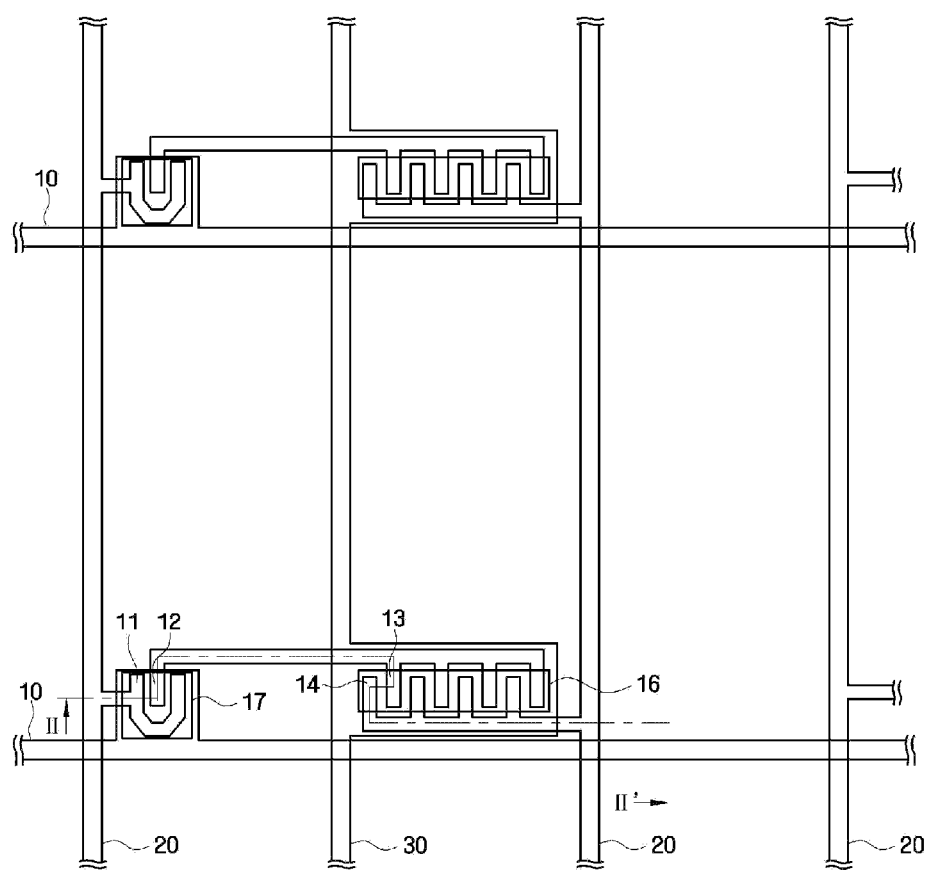
FIG. 1 is a layout view of a touch screen panel according to an exemplary embodiment of the present invention.

The invention is described more fully hereinafter with reference to the accompanying drawings, in which embodiments of the invention are shown. The invention may, however, be embodied in many different forms and should not be construed as being limited to the embodiments set forth herein. Rather, these embodiments are provided so that this disclosure is thorough, and will fully convey the scope of the invention to those skilled in the art. In the drawings, sizes and relative sizes of layers and regions may be exaggerated for clarity.

It will be understood that when an element or layer is referred to as being "on" or "connected to" another element or layer, it can be directly on or directly connected to the other element or layer, or intervening elements or layers may be present. In contrast, when an element or layer is referred to as being "directly on" or "directly connected to" another element or layer, there are no intervening elements or layers present. Like reference numerals in the drawings refer to like elements. As used herein, the term "and/or" includes any and all combinations of is one or more of the associated listed items.

Spatially relative terms, such as "below", "beneath", "lower", "above", "upper", and the like, may be used herein for ease of description to describe one element or feature's relationship to another element or feature as illustrated in the drawings. It will be understood that the spatially relative terms are intended to encompass different orientations of the device in use or operation in addition to the orientation depicted in the drawings.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "made of," when used in this specification, specify the presence of stated components, steps, operations, and/or elements, but do not preclude the presence or addition of one or more other components, steps, operations, elements, and/or groups thereof.

Embodiments of the invention are described herein with reference to layout and cross-section illustrations that are schematic illustrations of idealized embodiments of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. The regions illustrated in the figures are schematic in nature and their shapes are not intended to illustrate the actual shape of a region of a device and are not intended to limit the scope of the invention.

Throughout the specification, the term "film" may be used to denote a "layer," and the term "layer" may be used to denote a "film." That is, the term "film" may have the same is meaning as the term "layer."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a touch screen panel according to a first exemplary embodiment of the present invention will be described with reference to FIG. 1, FIG. 2, and FIG. 3.

FIG. 1 is a layout view of the touch screen panel according to an exemplary embodiment of the present invention. FIG. 2 is a cross-sectional view of the touch screen panel according to the first exemplary embodiment of the present invention, taken along line II-II' of FIG. 1. FIG. 3 is a view for explaining a principle by which the touch screen panel according to the first exemplary embodiment of the present invention reduces the reflection of external light.

Figure 2:
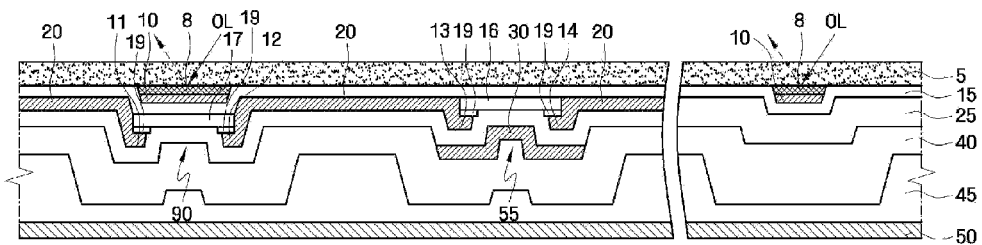
FIG. 2 is a cross-sectional view of the touch screen panel according to a first exemplary embodiment of the present invention, taken along line II-II' of FIG. 1.

Referring to FIG. 1 and FIG. 2, the touch screen panel according to the first exemplary embodiment comprises a first substrate 5, a first reflection-preventing film 8, a first gate wiring 10, a sensing wiring 20, and a second gate wiring 30.

Specifically, the first reflection-preventing film 8 is formed on the first substrate 5, and the first gate wiring 10 is formed on the first reflection-preventing film 8. The first reflection-preventing film 8 may be aligned with the first gate wiring 10.

A gate insulating film 15 is formed on the first gate wiring 10.

A semiconductor layer 17, a light sensing semiconductor layer 16, an ohmic contact layer 19, and the sensing wiring 20 are formed on the gate insulating film 15. The is sensing wiring 20 is insulated from the first gate wiring 10 and crosses the first gate wiring 10.

A passivation film 25 is formed on the semiconductor layer 17, the light sensing semiconductor layer 16, the ohmic contact layer 19, and the sensing wiring 20. The second gate wiring 30 is formed on the passivation film 25 to extend parallel to the sensing wiring 20. The second gate wiring 30 is insulated from the first gate wiring 10 and crosses the first gate wiring 10.

A light-shielding layer 40 is formed on the second gate wiring 30, and an overcoat layer 45 is formed on the light-shielding layer 40.

A common electrode 50 used to drive liquid crystals (not shown) is formed on the overcoat layer 45.

The first substrate 5 may be made of a non-conductive material such as glass or ceramic.

The first reflection-preventing film 8, which is aligned with the first gate wiring 10, may be metal oxide or nitride (SiNx). Specifically, the first reflection-preventing film 8 may be amorphous indium tin oxide (a-ITO) or an oxide or nitride of a metal material that constitutes the first gate wiring 10.

The first reflection-preventing film 8 reduces the reflection of the external light OL by the first gate wiring 10, which will be described later.

The first gate wiring 10 may be made of aluminum (Al)-based metal, such as aluminum and an aluminum alloy, silver (Ag)-based metal, such as silver and a silver alloy, copper (Cu)-based metal such as copper and a copper alloy, molybdenum (Mo)-based metal, such as molybdenum and a molybdenum alloy, chromium (Cr), titanium (Ti) or tantalum (Ta).

In addition, the first gate wiring 10 may have a multi-film structure composed of is two conductive films (see FIG. 3) with different physical characteristics. One of the two conductive films may be made of metal with low resistivity, such as aluminum-based metal, silver-based metal or copper-based metal, in order to reduce a signal delay or a voltage drop of the first gate wiring 10. The other one of the conductive films may be made of a different material, in particular, a material having superior contact characteristics with indium tin oxide (ITO) and indium zinc oxide (IZO), such as molybdenum-based metal, chromium, titanium, or tantalum. Examples of multi-film structures comprise a chromium lower film and an aluminum upper film and an aluminum lower film and a molybdenum upper film. In addition to the examples above, the first gate wiring 10 may be made of various other metals and conductors, and it may have other structures, such as a triple layered structure.

The gate insulating film 15, which is made of, for example, silicon nitride (SiNx), is disposed on the entire surface of the first substrate 5 having the first gate wiring 10.

The semiconductor layer 17 is formed on the gate insulating film 15 to overlap the first gate wiring 10. The semiconductor layer 17 is island-shaped and made of a semiconductor such as hydrogenated amorphous silicon or polycrystalline silicon. The ohmic contact layer 19 made of a material, such as silicide or n+ hydrogenated amorphous silicon doped with a high concentration of n-type impurities, is disposed on the semiconductor layer 17.

The light sensing semiconductor layer 16 is formed on the gate insulating film 15 to sense light.

The light sensing semiconductor layer 16 may have a mono-film structure or a multi-film structure composed of a material or materials selected from amorphous silicon (a-Si), amorphous silicon germanium (a-SiGe), and microcrystalline silicon (mc-Si). Specifically, the light sensing semiconductor layer 16 of the optical sensor 55 may comprise a-Si or a-SiGe to is sense visible light. To sense infrared rays, the light sensing semiconductor layer 16 of the optical sensor 55 may comprise a-SiGe or mc-Si.

The ohmic contact layer 19 made of a material, such as silicide or n+hydrogenated amorphous silicon doped with a high concentration of n-type impurities, is also disposed on the light sensing semiconductor layer 16.

The sensing wiring 20 is formed on the gate insulating film 15. The sensing wiring 20 is insulated from the first gate wiring 10 and crosses the first gate wiring 10.

The sensing wiring 20 extends in a vertical direction to cross the first gate wiring 10 and is insulated from the first gate wiring 10. The sensing wiring 20 comprises source electrode 11 and drain electrode 12 of a driving thin-film transistor 90 and source electrode 13 and drain electrode 14 of the optical sensor 55. The source electrode 11 of the driving thin-film transistor 90 branches off from the sensing wiring 20 and extends onto the ohmic contact layer 19. The drain electrode 12 of the driving thin-film transistor 90 is formed on the ohmic contact layer 19 to be separated from the source electrode 11 and to face the source electrode 11 with respect to the semiconductor layer 17. The source electrode 13 of the optical sensor 55 is connected to the drain electrode 12 of the driving thin-film transistor 90 and extends onto the ohmic contact layer 19. The drain electrode 14 of the optical sensor 55 is formed on the ohmic contact layer 19 to be separated from the source electrode 13 and to face the source electrode 13 with respect to the light sensing semiconductor layer 16.

The sensing wiring 20 is used to enable the optical sensor 55 and the driving thin-film transistor 90 to sense light.

The sensing wiring 20 may be made of chromium, molybdenum-based metal, or refractory metal such as tantalum and titanium. In addition, the sensing wiring 20 may have a is multi-film structure composed of a lower film (not shown), which is made of refractory metal, and an upper film (not shown) which is made of a material with low resistivity and is disposed on the lower film. Examples of multi-film structures comprise a chromium lower film and an aluminum upper film and an aluminum lower film and a molybdenum upper film. Alternatively, the multi-film structure may be a triple-film structure having molybdenum-aluminum-molybdenum films.

At least a portion of the sensing wiring 20 overlaps the semiconductor layer 17, and at least a portion of the sensing wiring 20 overlaps the light sensing semiconductor layer 16. Here, the ohmic contact layer 19 is interposed between the semiconductor layer 17 and the light sensing semiconductor layer 16, which are disposed under the ohmic contact layer 19, and the sensing wiring 20, which is disposed on the ohmic contact layer 19, and reduces contact resistance between them.

The passivation film 25 is formed on the entire surface of the first substrate 5 having the sensing wiring 20, the semiconductor layer 17, and the light sensing semiconductor layer 16.

The passivation film 25 may be made of an inorganic material such as silicon nitride or silicon oxide, an organic material having photosensitivity and superior planarization characteristics, or a low-k dielectric material formed by plasma enhanced chemical vapor deposition (PECVD), such as a-Si:C:O or a-Si:O:F. The passivation film 25 may be composed of a lower inorganic film and an upper organic film in order to protect exposed portions of the semiconductor layer 17 and the light sensing semiconductor layer 16 while taking advantage of the superior characteristics of an organic film.

The second gate wiring 30 is formed on the passivation film 25 to extend parallel is to the sensing wiring 20. The second gate wiring 30 is insulated from the first gate wiring 10 and crosses the first gate wiring 10.

The second gate wiring 30 applies a bias voltage to the optical sensor 55. The second gate wiring 30 may be made of the same material and have the same structure as the first gate wiring 10.

The optical sensor 55 comprises the light sensing semiconductor layer 16, the ohmic contact layer 19, the sensing wiring 20, and the second gate wiring 30. The optical sensor 55 outputs a sensing signal in response to light emitted from a backlight unit (not shown).

Specifically, when light emitted from the backlight unit (not shown) passes through the first substrate 5 and is reflected by a touch member (such as a reflective pen) disposed on the first substrate 5, the optical sensor 55 outputs a sensing signal, which indicates location information, in response to the reflected light.

The light-shielding layer 40 is formed on the second gate wiring 30. The light-shielding layer 40 may comprise chromium, metal (metal oxide) such as chromium oxide, or organic black resist.

An overcoat layer 45 may be formed on the light-shielding layer 40 to planarize step heights.

The common electrode 50 is disposed on the overcoat layer 45 and made of a transparent conductive material such as ITO or IZO. An alignment film (not shown), which aligns liquid crystal molecules (not shown), may be coated on the common electrode 50.

The principle by which the first reflection-preventing film 8 aligned with the first gate wiring 10 reduces the reflection of the external light OL will now be described in detail with reference to FIG. 2 and FIG. 3.

Figure 3:
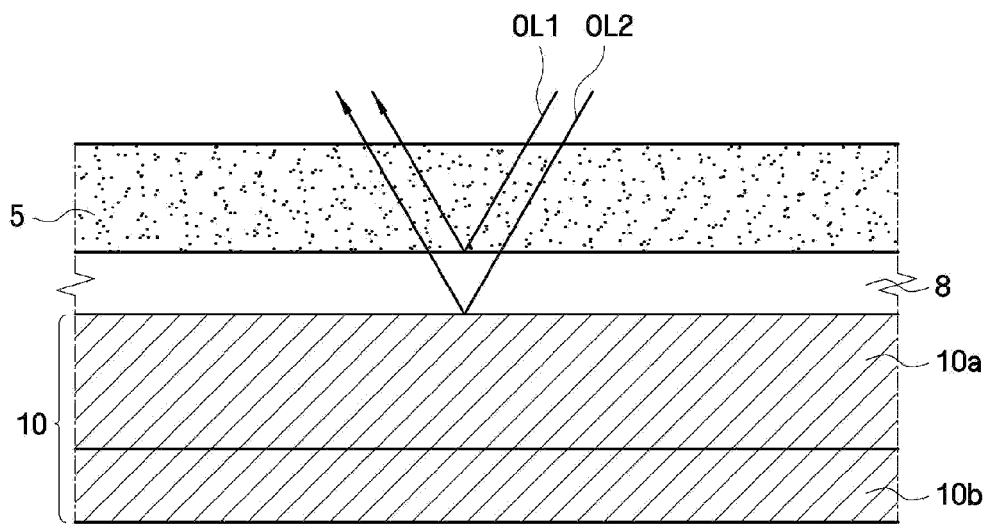
FIG. 3 is a view for explaining a principle by which the touch screen panel according to the first exemplary embodiment of the present invention reduces the reflection of external light.

Referring to FIG. 3, the first reflection-preventing film 8 is formed on the first substrate 5, and the first gate wiring 10 is formed on the first reflection-preventing film 8.

The first gate wiring 10 has a double-film structure composed of a first gate wiring lower film 10a and a first gate wiring upper film 10b.

Specifically, the first reflection-preventing film 8 may be an amorphous indium tin oxide (a-ITO) film, the first gate wiring lower film 10a may be an aluminum film, and the first gate wiring upper film 10b may be a molybdenum film.

Referring back to FIG. 3, the external light OL (that is, external light OL2) reflected by the first gate wiring lower film 10a deteriorates optical characteristics in a bright room and reduces a contrast ratio (CR). However, in the case of the touch screen panel according to the first exemplary embodiment, the external light OL (that is, external light OL1) is also reflected by the first reflection-preventing film 8. As a result, the amount of the external light OL2 reflected by the first gate wiring lower film 10a in a bright room is reduced.

Specifically, the external light OL2 reflected by the first gate wiring lower film 10a and the external light OL1 reflected by the first reflection-preventing film 8 destructively interfere with each other. Thus, the reflection of the external light OL2 by the first gate wiring lower film 10a is reduced.

When the first reflection-preventing film 8 is formed to reduce the reflection of the external light OL, the deterioration of optical characteristics in a bright room due to the reflection of the external light OL by a metal wiring layer, such as the first gate wiring 10, can be prevented. In addition, a reduction in the contrast ratio can be prevented.

Hereinafter, a touch screen panel according to a second exemplary embodiment of the present invention will be described with reference to FIG. 1, FIG. 4, and FIG. 5.

Figure 4:
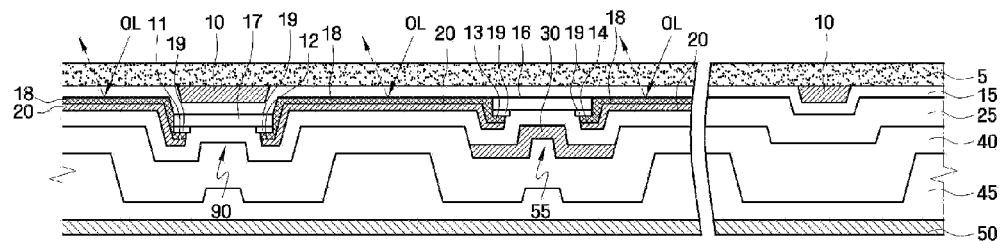
FIG. 4 is a cross-sectional view of a touch screen panel according to a second exemplary embodiment of the present invention, taken along line II-II' of FIG. 1.

FIG. 4 is a cross-sectional view of the touch screen panel according to the second exemplary embodiment of the present invention, taken along line II-II' of FIG. 1. FIG. 5 is a view for explaining a principle by which the touch screen panel according to the second exemplary embodiment of the present invention reduces the reflection of external light OL.

Referring to FIG. 1 and FIG. 4, the touch screen panel according to the second exemplary embodiment comprises a first substrate 5, a first gate wiring 10, a second reflection-preventing film 18, a sensing wiring 20, and a second gate wiring 30.

Specifically, the first gate wiring 10 is formed on the first substrate 5, and the second reflection-preventing film 18 and the sensing wiring 20 are formed above the gate wiring 10. The second reflection-preventing film 18 and the sensing wiring 20 are insulated from the first gate wiring 10 and cross the first gate wiring 10. The second reflection-preventing film 18 and the sensing wiring 20 may be aligned with each other.

The second gate wiring 30 is formed above the sensing wiring 20 to extend parallel to the sensing wiring 20. In addition, the second gate wiring 30 is insulated from the first gate wiring 10 and crosses the first gate wiring 10.

The touch screen panel according to the second exemplary embodiment is identical to the touch screen panel according to the previous exemplary embodiment except that the second reflection-preventing film 18 is formed in the present exemplary embodiment while the first reflection-preventing film 8 is formed in the previous exemplary embodiment. Thus, a description of elements identical to those of the previous exemplary embodiment will be omitted.

The second reflection-preventing film 18 aligned with the sensing wiring 20 may be metal oxide or nitride, for example, SiNx. Specifically, the second reflection-preventing film 18 may be amorphous indium tin oxide (a-ITO).

The second reflection-preventing film 18 may also be an oxide of a metal material that constitutes the sensing wiring 20. That is, when the sensing wiring 20 is a triple film composed of a molybdenum film, an aluminum film, and a molybdenum film, the second reflection-preventing film 18 may be a molybdenum oxide (MoOx) film.

The second reflection-preventing film 18 reduces the reflection of the external light OL by the sensing wiring 20.

The principle by which the second reflection-preventing film 18 aligned with the sensing wiring 20 reduces the reflection of the external light OL will now be described in detail with reference to FIG. 4 and FIG. 5.

Figure 5:
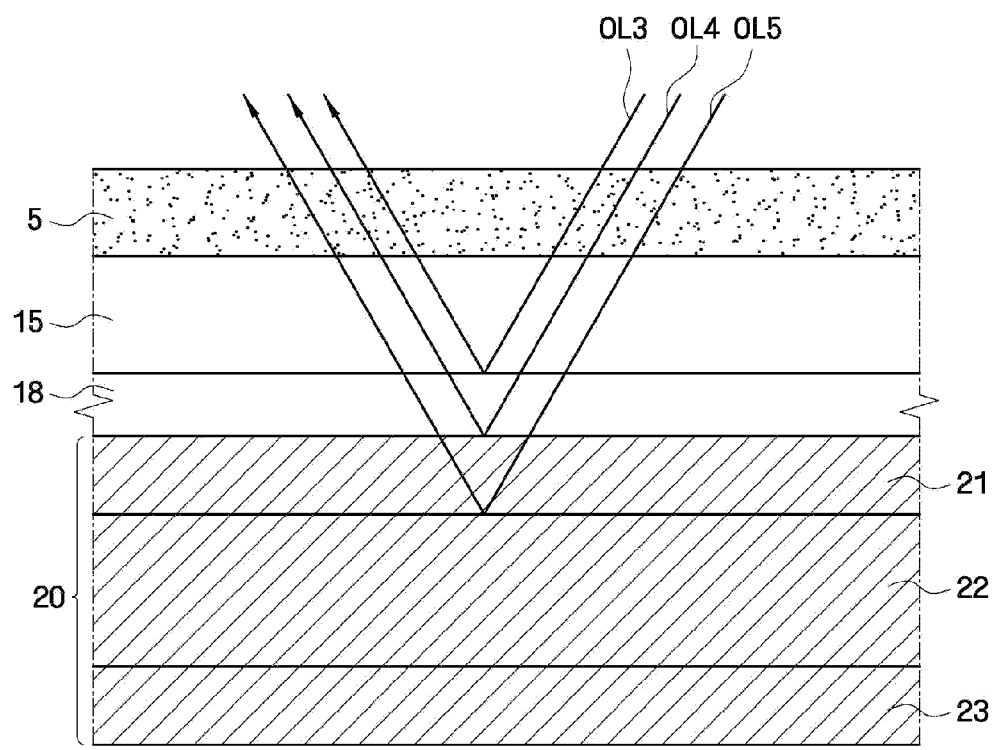
FIG. 5 is a view for explaining a principle by which the touch screen panel according to the second exemplary embodiment of the present invention reduces the reflection of external light.

Referring to FIG. 5, a gate insulating film 15 is formed on the first substrate 5, and the second reflection-preventing film 18 is formed on the gate insulating film 15. The sensing wiring 20 is formed on the second reflection-preventing film 18.

The sensing wiring 20 may have a triple-film structure composed of a sensing wiring lower film 21, a sensing wiring intermediate film 22, and a sensing wiring upper film 23.

Specifically, the second reflection-preventing film 18 may be an amorphous indium tin oxide (a-ITO) film, the sensing wiring lower film 21 may be a molybdenum film, the sensing wiring intermediate film 22 may be an aluminum film, and the sensing wiring upper film 23 may be a molybdenum film.

Referring back to FIG. 5, the external light OL (that is, external light OL5) reflected by the sensing wiring intermediate film 22 deteriorates optical characteristics in a bright room and reduces a contrast ratio. However, in the case of the touch screen panel according to the second exemplary embodiment, the external light OL (that is, external light OL3 and OL4) is also reflected by the second reflection-preventing film 18. As a result, the amount of the external is light OL5 reflected by the sensing wiring intermediate film 22 in a bright room is reduced.

Specifically, the external light OL5 reflected by the sensing wiring intermediate film 22 and the external light OL3 and OL4 reflected by the second reflection-preventing film 18 destructively interfere with each other. Thus, the reflection of the external light OL5 by the sensing wiring intermediate film 22 is reduced.

When the second reflection-preventing film 18 is formed to reduce the reflection of the external light OL, the deterioration of optical characteristics in a bright room due to the reflection of the external light OL by a metal wiring layer, such as the sensing wiring 20, can be prevented. In addition, a reduction in the contrast ratio can be prevented.

Figure 6:
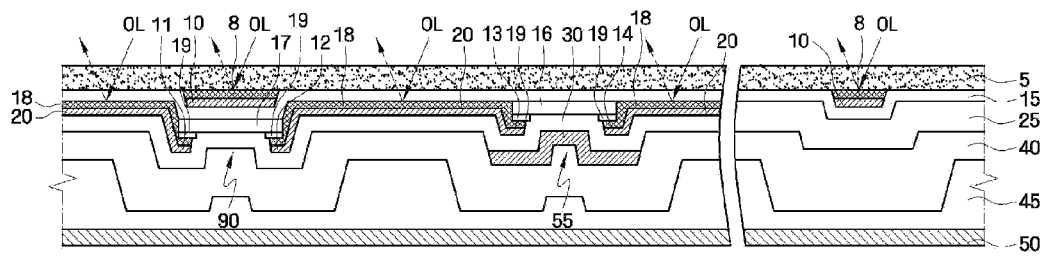
FIG. 6 is a cross-sectional view of a touch screen panel according to a third exemplary embodiment of the present invention, taken along line II-II' of FIG. 1.

Hereinafter, a touch screen panel according to a third exemplary embodiment of the present invention will be described with reference to FIG. 1 and FIG. 6. FIG. 6 is a cross-sectional view of the touch screen panel according to the third exemplary embodiment of the present invention, taken along line II-II' of FIG. 1.

Referring to FIG. 1 and FIG. 6, the touch screen panel according to the third exemplary embodiment comprises a first substrate 5, a first reflection-preventing film 8, a first gate wiring 10, a second reflection-preventing film 18, a sensing wiring 20, and a second gate wiring 30.

Specifically, the first reflection-preventing film 8 is formed on the first substrate 5, and the first gate wiring 10 is formed on the first reflection-preventing film 8. The first reflection-preventing film 8 and the first gate wiring 10 may be aligned with each other.

The second reflection-preventing film 18 and the sensing wiring 20 are formed above the first gate wiring 10. The second reflection-preventing film 18 and the sensing wiring 20 are insulated from the first gate wiring 10 and cross the first gate wiring 10. The second is reflection-preventing film 18 and the sensing wiring 20 may be aligned with each other.

The second gate wiring 30 is formed above the sensing wiring 20 to extend parallel to the sensing wiring 20. In addition, the second gate wiring 30 is insulated from the first gate wiring 10 and crosses the first gate wiring 10.

The first reflection-preventing film 8 and the second reflection-preventing film 18 are identical to those according to the previous exemplary embodiments, and thus a detailed description thereof will be omitted. In addition, other elements of the touch screen panel according to the third exemplary embodiment are identical to those of the previous exemplary embodiments described above, and thus a detailed description thereof will be omitted.

Considering the first exemplary embodiment and the second exemplary embodiment described above, when both of the first reflection-preventing film 8 and the second reflection-preventing film 18 are formed to reduce the reflection of external light OL, the deterioration of optical characteristics in a bright room due to the reflection of the external light OL by metal wiring layers, such as the first gate wiring 10 and the sensing wiring 20, can be prevented. In addition, a reduction in the contrast ratio can be prevented.

Figure 7:
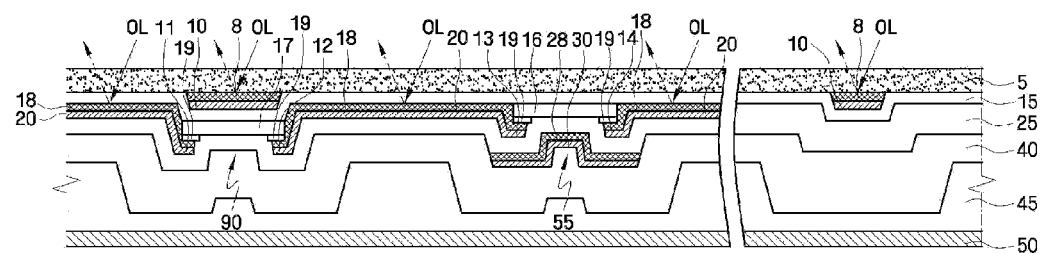
FIG. 7 is a cross-sectional view of a touch screen panel according to a fourth exemplary embodiment of the present invention, taken along line II-II' of FIG. 1.

Hereinafter, a touch screen panel according to a fourth exemplary embodiment of the present invention will be described with reference to FIG. 1 and FIG. 7. FIG. 7 is a cross-sectional view of the touch screen panel according to the fourth exemplary embodiment of the present invention, taken along line II-II' of FIG. 1.

Referring to FIG. 1 and FIG. 7, the touch screen panel according to the fourth exemplary embodiment comprises a first substrate 5, a first reflection-preventing film 8, a first gate wiring 10, a second reflection-preventing film 18, a sensing wiring 20, a third reflection-preventing film 28, and a second gate wiring 30.

Specifically, the first reflection-preventing film 8 is formed on the first substrate 5, and the first gate wiring 10 is formed on the first reflection-preventing film 8. The first reflection-preventing film 8 and the first gate wiring 10 may be aligned with each other.

The second reflection-preventing film 18 and the sensing wiring 20 are formed above the first gate wiring 10. The second reflection-preventing film 18 and the sensing wiring 20 are insulated from the first gate wiring 10 and cross the first gate wiring 10. The second reflection-preventing film 18 and the sensing wiring 20 may be aligned with each other.

The third reflection-preventing film 28 and the second gate wiring 30 are formed above the sensing wiring 20 to extend parallel to the sensing wiring 20. In addition, the third reflection-preventing film 28 and the second gate wiring 30 are insulated from the first gate wiring 10 and cross the first gate wiring 10. The third reflection-preventing film 28 and the second gate wiring 30 may be aligned with each other.

The first reflection-preventing film 8 and the second reflection-preventing film 18 are identical to those according to the previous exemplary embodiments, and thus a detailed description thereof will be omitted.

The third reflection-preventing film 28 aligned with the second gate wiring 30 may be metal oxide or nitride, for example, SiNx. Specifically, the third reflection-preventing film 28 may be amorphous indium tin oxide (a-ITO) or an oxide or nitride of a metal material that constitutes the second gate wiring 30.

Other elements of the touch screen panel according to the fourth exemplary embodiment are identical to those of the previous exemplary embodiments described above, and thus a detailed description thereof will be omitted.

The third reflection-preventing film 28 reduces the reflection of external light OL by the second gate wiring 30. This function of the third reflection-preventing film 28 is similar to that of the first exemplary embodiment and the second exemplary embodiment, and thus will not be described in detail.

When all of the first reflection-preventing film 8, the second reflection-preventing film 18, and the third reflection-preventing film 28 are formed to reduce the reflection of the external light OL, the deterioration of optical characteristics in a bright room due to the reflection of the external light OL by metal wiring layers, such as the first gate wiring 10, the sensing wiring 20, and the second gate wiring 30, can be prevented. In addition, a reduction in the contrast ratio can be prevented.

A fifth exemplary embodiment, in which the first reflection-preventing film 8 and the third reflection-preventing film 28 are formed, and a sixth exemplary embodiment, in which the second reflection-preventing film 18 and the third reflection-preventing film 28 are formed, can be derived from the first exemplary embodiment, the second exemplary embodiment, the third exemplary embodiment and the fourth exemplary embodiment. Therefore, a detailed description thereof will be omitted.

Figure 8:
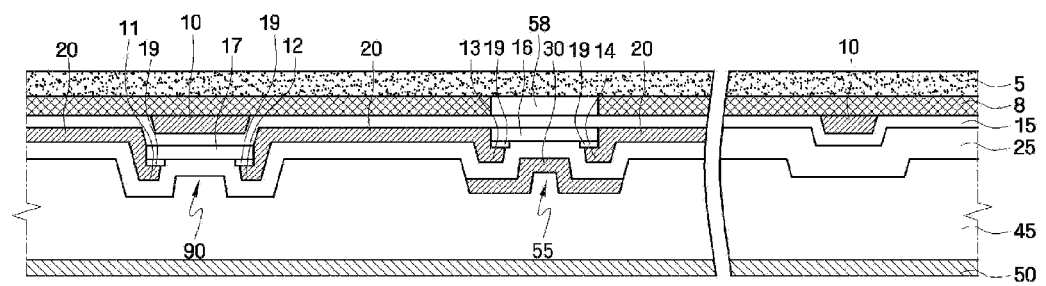
FIG. 8 is a cross-sectional view of a touch screen panel according to a seventh exemplary embodiment of the present invention, taken along line II-II' of FIG. 1.

Hereinafter, a touch screen panel according to a seventh exemplary embodiment of the present invention will be described with reference to FIG. 1 and FIG. 8. FIG. 8 is a cross-sectional view of the touch screen panel according to the seventh exemplary embodiment of the present invention, taken along line II-II' of FIG. 1.

Referring to FIG. 1 and FIG. 8, the touch screen panel according to the seventh exemplary embodiment comprises a first substrate 5, a first reflection-preventing film 8, a light transmitting film 58, a first gate wiring 10, a sensing wiring 20, and a second gate wiring 30.

Specifically, the first reflection-preventing film 8 is interposed between the first is substrate 5 and the first gate wiring 10, between the first substrate 5 and the sensing wiring 20, and between the first substrate 5 and the second gate wiring 30. Here, the first reflection-preventing film 8 exposes a light sensing semiconductor layer 16. The light transmitting film 58 is formed between the first substrate 5 and the exposed light sensing semiconductor layer 16.

The first gate wiring 10 is formed on the first reflection-preventing film 8, and the sensing wiring 20 is formed above the first gate wiring 10. The sensing wiring 20 is insulated from the first gate wiring 10 and crosses the first gate wiring 10.

The second gate wiring 30 is formed above the sensing wiring 20 to extend parallel to the sensing wiring 20. In addition, the second gate wiring 30 is insulated from the first gate wiring 10 and crosses the first gate wiring 10.

The first reflection-preventing film 8 may be a black matrix. Specifically, the first reflection-preventing film 8 may be an inorganic black matrix which facilitates the formation of the first gate wiring 10. For example, the first reflection-preventing film 8 may be an inorganic black matrix which comprises at least one of chromium and chromium oxide. Here, a light-shielding layer (indicated by reference numeral 40 in FIG. 2) may be omitted.

The light transmitting film 58 may be any one of a bandpass filter and an organic layer. Specifically, when an optical sensor 55 is an infrared ray sensor, the light transmitting film 58 may be an infrared ray bandpass filter. When the optical sensor 55 is a visible light sensor, the light transmitting film 58 may be an organic film. In addition, when the optical sensor 55 is an infrared ray sensor and when the first reflection-preventing film 8 is a black matrix and functions as an infrared ray bandpass filter, the light transmitting film 58 formed by removing a portion of the first reflection-preventing film 8 may be omitted.

Other elements of the touch screen panel according to the seventh exemplary is embodiment are identical to those of the previous exemplary embodiments described above, and thus a detailed description thereof will be omitted.

The first reflection-preventing film 8 reduces the reflection of external light OL by the first gate wiring 10, the sensing wiring 20, and the second gate wiring 30. This function of the first reflection-preventing film 8 achieved when the first reflection-preventing film 8 is a black matrix can be derived from the above description by those of ordinary skill in the art and thus will not be described in detail.

When the first reflection-preventing film 8 is formed to reduce the reflection of the external light OL, the deterioration of optical characteristics in a bright room due to the reflection of the external light OL by metal wiring layers, such as the first gate wiring 10, the sensing wiring 20, and the second gate wiring 30, can be prevented. In addition, a reduction in the contrast ratio can be prevented.

Figure 9:
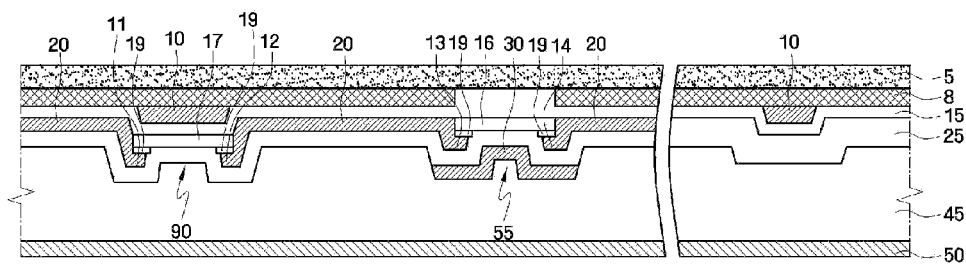
FIG. 9 is a cross-sectional view of a touch screen panel according to an eighth exemplary embodiment of the present invention, taken along line II-II' of FIG. 1.

Hereinafter, a touch screen panel according to an eighth exemplary embodiment of the present invention will be described with reference to FIG. 1 and FIG. 9. FIG. 9 is a cross-sectional view of the touch screen panel according to the eighth exemplary embodiment of the present invention, taken along line II-II' of FIG. 1.

Referring to FIG. 1 and FIG. 9, the touch screen panel according to the eighth exemplary embodiment is identical to the touch screen panel according to the seventh exemplary embodiment except that the light transmitting film 58 of the touch screen panel according to the seventh exemplary embodiment is omitted. Thus, a description of elements identical to those of the seventh exemplary embodiment is omitted.

Figure 10:
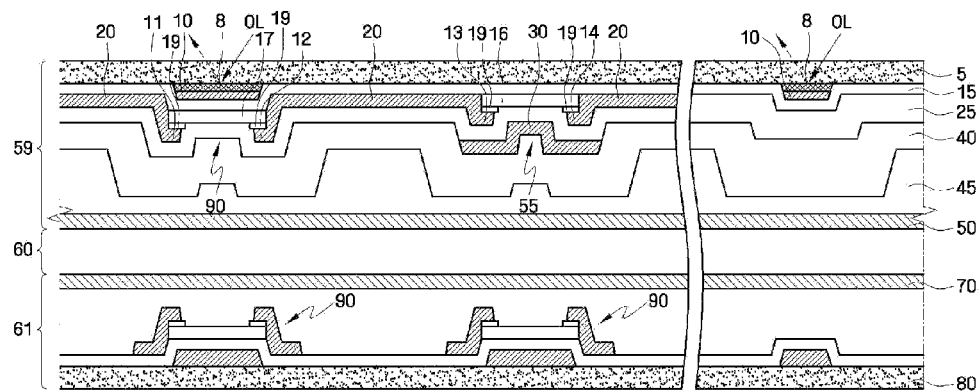
FIG. 10 is a cross-sectional view of a touch screen panel according to a ninth is exemplary embodiment of the present invention.

Hereinafter, a touch screen panel according to a ninth exemplary embodiment of the present invention will be described with reference to FIG. 1 and FIG. 10. FIG. 10 is a cross-sectional view of the touch screen panel according to the ninth exemplary embodiment of the present invention.

Referring to FIG. 10, the touch screen panel according to the ninth exemplary embodiment comprises a touch panel 59, a liquid crystal layer 60, and a display panel 61.

The touch panel 59 comprises elements identical to those of the first exemplary embodiment described above. Thus, a detailed description of the elements identical to those of the first exemplary embodiment will be omitted.

The liquid crystal layer 60 comprises liquid crystal molecules (not shown) which have optical and electrical characteristics, such as an anisotropic index of refraction and an anisotropic dielectric constant, and are arranged in a predetermined form. An electric field formed between the touch panel 59 and the display panel 61 changes the arrangement of the liquid crystal molecules in the liquid crystal layer 60, which, in turn, controls the transmittance of light that passes through the liquid crystal layer 60.

The display panel 61 comprises a second substrate 80, a driving thin-film transistor 90, and a pixel electrode 70.

Specifically, the second substrate 80 may be made of a non-conductive material such as glass or ceramic.

The driving thin-film transistor 90 is formed above the second substrate 80. The driving thin-film transistor 90 comprises a gate electrode, a source electrode, a drain electrode, and an island-shaped semiconductor layer which is made of a semiconductor such as amorphous silicon or polycrystalline silicon. The driving thin-film transistor 90 drives a pixel.

The pixel electrode 70 is formed above the driving thin-film transistor 90. The pixel electrode 70 is electrically connected to the drain electrode of the driving thin-film is transistor 90 by a contact hole (not shown) and is located in a pixel. When a data voltage is applied to the pixel electrode 70, the pixel electrode 70 generates an electric field, together with a common electrode 50 of the touch panel 59. The generated electric field determines the arrangement of the liquid crystal molecules (not shown) in the liquid crystal layer 60 interposed between the pixel electrode 70 and the common electrode 50.

The pixel electrode 70 may be made of a transparent conductor such as ITO or IZO or a reflective conductor such as aluminum.

The touch panel 59 shown in FIG. 10 comprises elements identical to those of the first exemplary embodiment. However, the touch panel 59 may also comprise elements identical to those of any one of the second exemplary embodiment, the third exemplary embodiment, the fourth exemplary embodiment, the fifth exemplary embodiment or the sixth exemplary embodiment.

Figure 11:
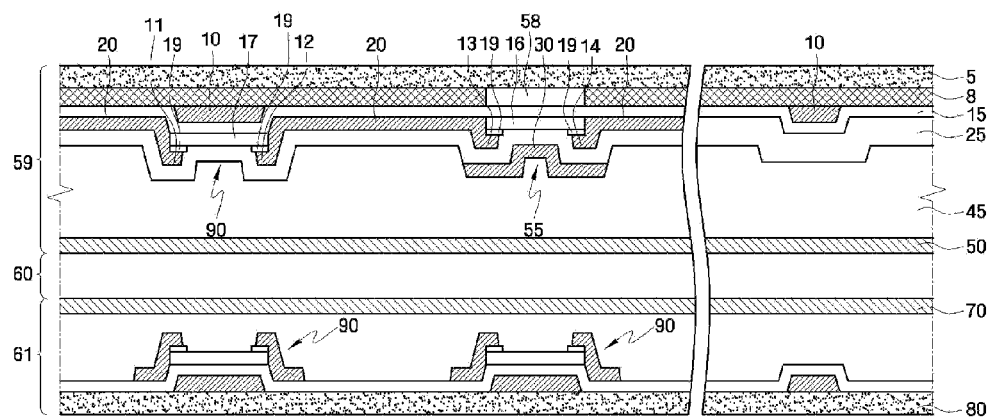
FIG. 11 is a cross-sectional view of a touch screen panel according to a tenth exemplary embodiment of the present invention.

Hereinafter, a touch screen panel according to a tenth exemplary embodiment of the present invention will be described with reference to FIG. 11. FIG. 11 is a cross-sectional view of the touch screen panel according to the tenth exemplary embodiment of the present invention.

Referring to FIG. 11, the touch screen panel according to the tenth exemplary embodiment comprises a touch panel 59, a liquid crystal layer 60, and a display panel 61.

The touch panel 59 comprises elements identical to those of the seventh exemplary embodiment described above. Thus, a detailed description of the elements identical to those of the seventh exemplary embodiment is omitted.

In addition, the liquid crystal layer 60 and the display panel 61 comprise elements identical to those of the ninth exemplary embodiment, and thus a detailed description of these is elements is also omitted.

While the touch panel 59 shown in FIG. 11 comprises elements identical to those of the seventh exemplary embodiment, alternatively, it may also comprise elements identical to those of the eighth exemplary embodiment.

Hereinafter, a method of manufacturing a touch screen panel according to an exemplary embodiment of the present invention will be described with reference to FIG. 1, FIG. 12, FIG. 13, FIG. 14, FIG. 15, FIG. 16, FIG. 17, and FIG. 18. FIG. 12 through FIG. 18 are views showing intermediate processes comprised in the method of fabricating a touch screen panel according to the exemplary embodiment of the present invention. The exemplary manufacturing method described using FIG. 12 through FIG. 18 is merely an example and can be modified according to the number of masks. That is, the present invention is not limited to this exemplary manufacturing method.

Figure 12:
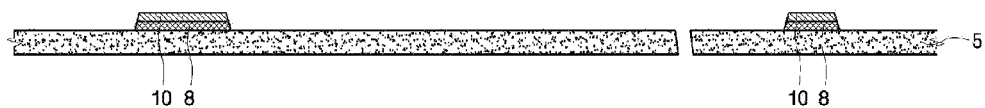
FIG. 12, FIG. 13, FIG. 14, FIG. 15, FIG. 16, FIG. 17, and FIG. 18 are views showing intermediate processes included in a method of fabricating a touch screen panel according to an exemplary embodiment of the present invention.

Referring to FIG. 12, a first reflection-preventing film 8 is formed on a first substrate 5, and a first gate wiring 10 is formed on the first reflection-preventing film 8.

Specifically, the first reflection-preventing film 8 is formed on the first substrate 5 by sputtering. After the first gate wiring 10 is formed, the first reflection-preventing film 8 and the first gate wiring 10 are etched simultaneously. When necessary, a portion of the first gate wiring 10 may be etched using a first etchant. Then, the remaining portion of the first gate wiring 10 and the first reflection-preventing film 8 may be etched simultaneously using a second etchant, different from the first etchant.

Figure 13:
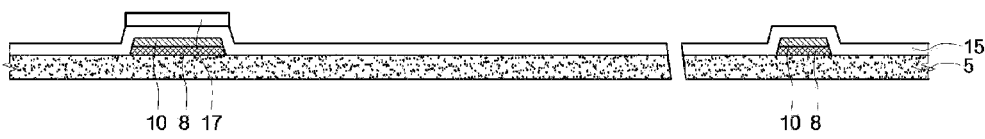

Referring to FIG. 13, a gate insulating film 15 is formed on the first gate wiring, and a semiconductor layer 17 is formed on the gate insulating film 15.

Specifically, the gate insulating film 15, which is made of silicon nitride, and an is intrinsic amorphous silicon layer are deposited successively by, for example, chemical vapor deposition (CVD). Then, a photolithography process is performed on the intrinsic amorphous silicon layer to form the island-shaped semiconductor layer 17 on a region of the first insulating film 15 which corresponds to a gate of a switching thin-film transistor comprised in the first gate wiring 10.

Figure 14:
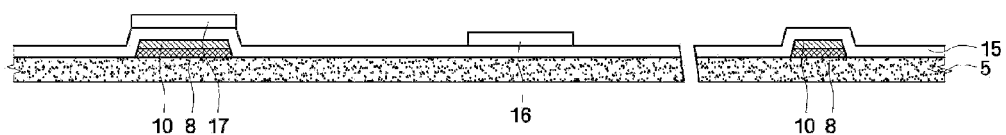

Referring to FIG. 14, a light sensing semiconductor layer 16 is formed on the gate insulating film 15. Specifically, the light sensing semiconductor layer 16 may be formed by CVD to have a mono-film structure or a multi-film structure composed of a material or materials selected from amorphous silicon (a-Si), amorphous silicon germanium (a-SiGe), and microcrystalline silicon (mc-Si).

The light sensing semiconductor layer 16 may be made of the same material as the semiconductor layer 17. In this case, the process shown in FIG. 14 is not performed separately. That is, the light sensing semiconductor layer 16 may be formed at the same time as the semiconductor layer 17 in the process shown in FIG. 13.

Figure 15:
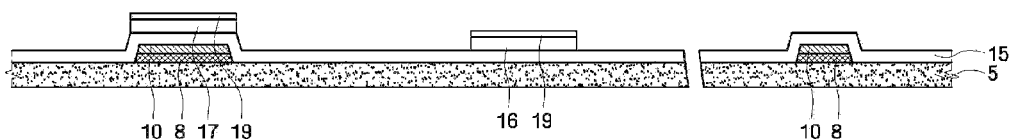

Referring to FIG. 15, an ohmic contact layer 19 is formed on the semiconductor layer 17 and the light sensing semiconductor layer 16.

Specifically, a doped amorphous silicon layer is deposited on the semiconductor layer 17 and the light sensing semiconductor layer 16 by CVD to form the ohmic contact layer 19.

Figure 16:
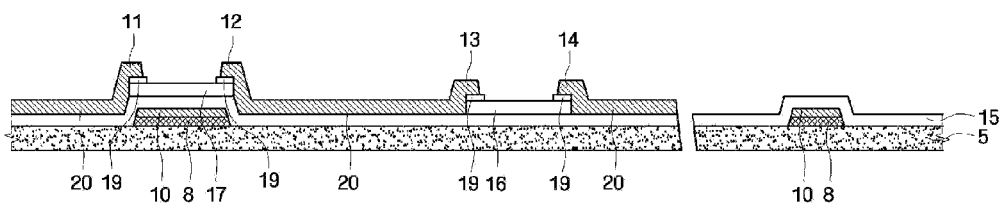

Referring to FIG. 16, a sensing wiring 20 is formed on the gate insulating film 15 and the ohmic contact layer 19 by sputtering.

Specifically, the sensing wiring 20 is formed on the gate insulating film 15 and the ohmic contact layer 19 by sputtering. Then, portions of the doped amorphous silicon layer is uncovered by the sensing wiring 20 are etched such that the ohmic contact layer 19 is divided into two regions with respect to each of the semiconductor layer 17 and the light sensing semiconductor layer 16. As a result, a source electrode 11 and a drain electrode 12 of a driving thin-film transistor 90 and a source electrode 13 and a drain electrode 14 of an optical sensor 55 are formed. Here, a portion of the semiconductor layer 17 and a portion of the light sensing semiconductor layer 16 are exposed by the divided ohmic contact layer 19. To stabilize surfaces of the exposed portions of the semiconductor layer 17 and the light sensing semiconductor layer 16, an oxygen plasma process may be performed.

Figure 17:
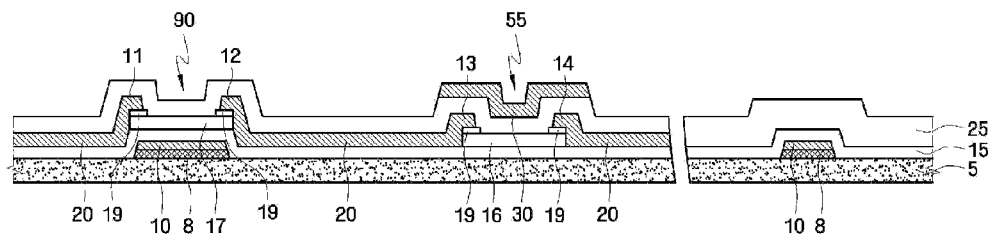

Referring to FIG. 17, a passivation film 25 is formed, and a second gate wiring 30 is formed.

Specifically, the passivation film 25 is formed by depositing one or more of an inorganic material such as silicon nitride (SiNx), an organic material having photosensitivity and superior planarization characteristics, and a low-k dielectric material formed by PECVD, such as a-Si:C:O or a-Si:O:F.

Next, the second gate wiring 30 is formed and then etched.

Figure 18:
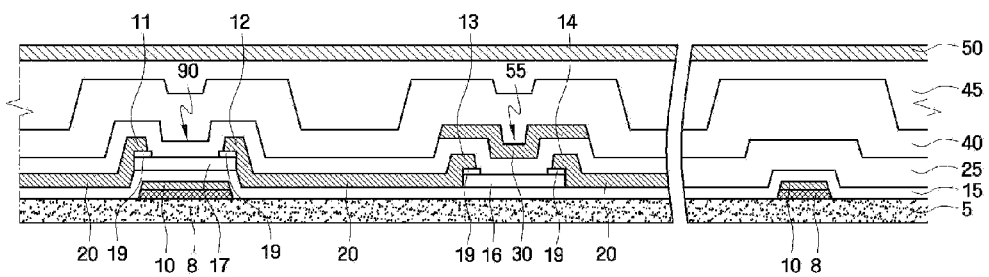

Referring to FIG. 18, a light shielding layer 40, an overcoat layer 45, and a common electrode 50 are formed sequentially.

When the first reflection-preventing film 8 is formed under the first gate wiring 10 as described above, the deterioration of optical characteristics in a bright room due to the reflection of external light by a metal wiring layer, such as the first gate wiring 10, can be prevented. In addition, a reduction in the contrast ratio can be prevented.

In FIG. 12, FIG. 13, FIG. 14, FIG. 15, FIG. 16, FIG. 17, and FIG. 18, the method of fabricating the touch screen panel according to the first exemplary embodiment is shown. However, the touch screen panels according to the second exemplary embodiment, the third exemplary embodiment, the fourth exemplary embodiment, the fifth exemplary embodiment and the sixth exemplary embodiment can also be manufactured using methods similar to this method. Since the methods of manufacturing the touch screen panels according to the second through sixth exemplary embodiments can be easily derived from the above description by those of ordinary skill in the art, a detailed description thereof is omitted.

Hereinafter, a method of manufacturing a touch screen panel according to another exemplary embodiment of the present invention will be described with reference to FIG. 1, FIG. 19, FIG. 20, FIG. 21, FIG. 22, FIG. 23, FIG. 24, FIG. 25, and FIG. 26. FIG. 19 through FIG. 26 are views showing intermediate processes comprised in the method of fabricating a touch screen panel according to the exemplary embodiment of the present invention. The manufacturing method described using FIG. 19 through FIG. 26 is merely an example and can be modified according to the number of masks. That is, the present invention is not limited to this exemplary manufacturing method.

Figure 19:
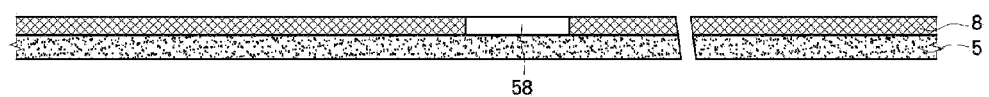
FIG. 19, FIG. 20, FIG. 21, FIG. 22, FIG. 23, FIG. 24, FIG. 25, and FIG. 26 are views showing intermediate processes included in a method of fabricating a touch screen panel according to another exemplary embodiment of the present invention.

Referring to FIG. 19, a first reflection-preventing film 8 and a light transmitting film 58 are formed on a first substrate 5.

Specifically, an inorganic black matrix including at least one of chromium and chromium oxide is formed on the first substrate 5. Here, a region of the inorganic black matrix, in which a light sensing semiconductor layer 16 (see FIG. 8) is to be formed, is exposed. Next, the light transmitting film 58 made of any one of a bandpass filter and an organic film is formed.

As described above, when a light sensor 55 is an infrared ray sensor and when the first reflection-preventing film 8 functions as an infrared ray bandpass filter, the region of the inorganic black matrix, in which the light sensing semiconductor layer 16 is to be formed, may is not be exposed.

Figure 20:
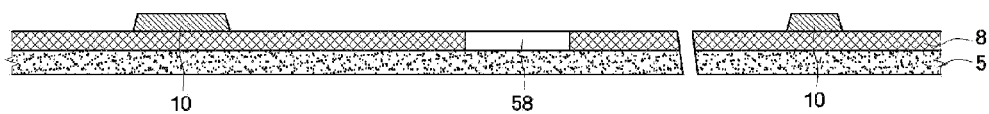

Referring to FIG. 20, a first gate wiring 10 is formed on the first reflection-preventing film 8. Specifically, the first gate wiring 10 is formed and then etched.

Figure 21:
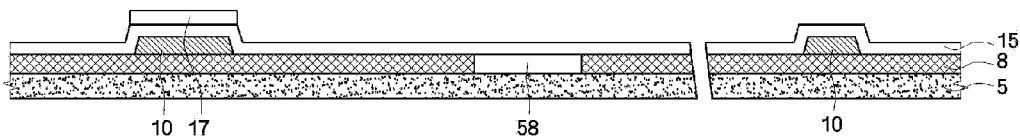

Referring to FIG. 21, a gate insulating film 15 is formed on the first gate wiring, and a semiconductor layer 17 is formed on the gate insulating film 15.

Specifically, the gate insulating film 15, which is made of silicon nitride, and an intrinsic amorphous silicon layer are deposited successively by, for example, CVD. Then, a photolithography process is performed on the intrinsic amorphous silicon layer to form the island-shaped semiconductor layer 17 on a region of the first insulating film 15 which corresponds to a gate of a switching thin-film transistor comprised in the first gate wiring 10.

Figure 22:
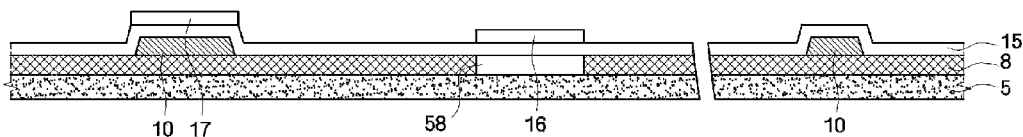

Referring to FIG. 22, the light sensing semiconductor layer 16 is formed on a region of the gate insulating film 15 which corresponds to the light transmitting film 58. The light sensing semiconductor layer 16 may be made of the same material as the semiconductor layer 17. In this case, the process shown in FIG. 22 is not performed separately. That is, the light sensing semiconductor layer 16 may be formed at the same time as the semiconductor layer 17 in the process shown in FIG. 21.

Figure 23:
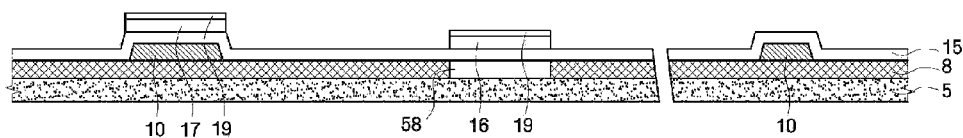

Referring to FIG. 23, an ohmic contact layer 19 is formed on the semiconductor layer 17 and the light sensing semiconductor layer 16.

Specifically, a doped amorphous silicon layer is deposited on the semiconductor layer 17 and the light sensing semiconductor layer 16 by CVD to form the ohmic contact layer 19.

Figure 24:
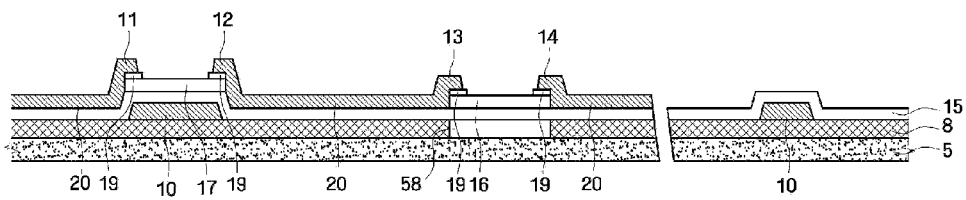

Referring to FIG. 24, a sensing wiring 20 is formed on the gate insulating film 15 and the ohmic contact layer 19 by sputtering.

Specifically, the sensing wiring 20 is formed on the gate insulating film 15 and the ohmic contact layer 19 by sputtering. Then, portions of the doped amorphous silicon layer uncovered by the sensing wiring 20 are etched such that the ohmic contact layer 19 is divided into two regions with respect to each of the semiconductor layer 17 and the light sensing semiconductor layer 16. As a result, a source electrode 11 and a drain electrode 12 of a driving thin-film transistor 90 and a source electrode 13 and a drain electrode 14 of an optical sensor 55 are formed. Here, a portion of the semiconductor layer 17 and a portion of the light sensing semiconductor layer 16 are exposed by the divided ohmic contact layer 19. To stabilize surfaces of the exposed portions of the semiconductor layer 17 and the light sensing semiconductor layer 16, an oxygen plasma process may be performed.

Figure 25:
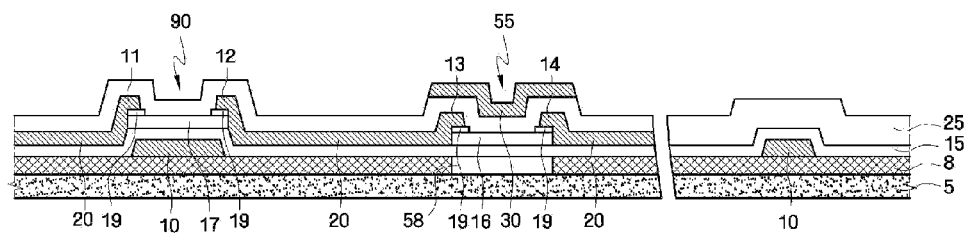

Referring to FIG. 25, a passivation film 25 is formed, and the second gate wiring 30 is formed.

Specifically, the passivation film 25 is formed by depositing one or more of an inorganic material such as silicon nitride (SiNx), an organic material having photosensitivity and superior planarization characteristics, and a low-k dielectric material formed by PECVD, such as a-Si:C:O or a-Si:O: F.

Next, the second gate wiring 30 is formed and then etched.

Figure 26:
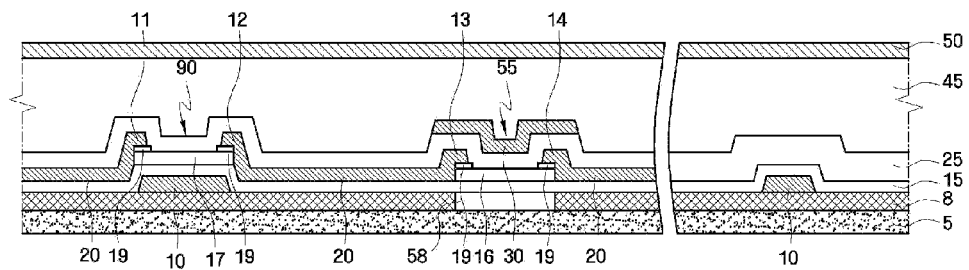

Referring to FIG. 26, an overcoat layer 45 and a common electrode 50 are formed sequentially.

When the first reflection-preventing film 8 is interposed between the first substrate 5 and the first gate wiring 10, between the first substrate 5 and the sensing wiring 20, and between the first substrate 5 and the second gate wiring 30 as described above, the deterioration of optical characteristics in a bright room due to the reflection of external light by a is metal wiring layer, such as the first gate wiring 10, can be prevented. In addition, a reduction in the contrast ratio can be prevented.

In FIG. 19, FIG. 20, FIG. 21, FIG. 22, FIG. 23, FIG. 24, FIG. 25, and FIG. 26, the method of fabricating the touch screen panel according to the seventh exemplary embodiment is shown. However, the touch screen panel according to the eighth exemplary embodiment can also be manufactured using a method similar to this method. Since the method of manufacturing the touch screen panel according to the eighth exemplary embodiment can be easily derived from the above description by those of ordinary skill in the art, a detailed description thereof is omitted.

The methods of manufacturing the touch screen panels according to only the first exemplary embodiment, the second exemplary embodiment, the third exemplary embodiment, the fourth exemplary embodiment, the fifth exemplary embodiment, the sixth exemplary embodiment, the seventh exemplary embodiment, and the eighth exemplary embodiment have been described above. However, methods of manufacturing the touch screen panels according to the ninth exemplary embodiment and the tenth exemplary embodiment, which additionally comprise the liquid crystal layer 60 (see FIG. 10 and FIG. 11) and the display panel 61 (see FIG. 10 and FIG. 11), can be readily derived from the above description by those of ordinary skill in the art, and thus a detailed description thereof is omitted.

Hereinafter, the present invention will be described in greater detail by way of Example. Features undisclosed herein can be easily derived by those of ordinary skill in the art to which the present invention pertains, and thus a detailed description thereof is omitted.

EXAMPLE

A molybdenum film was stacked on a transparent insulating substrate to a is thickness of 500 Å, and an aluminium film was stacked on the molybdenum film to a thickness of 2500 Å. Then, the reflectivity of the resultant structure was measured three times by irradiating light onto the aluminium film.

Next, an amorphous indium tin oxide (a-ITO) film was stacked on the aluminium film to thicknesses of 350, 450, 550, and 650 Å for different experiments. Then, the reflectivity of each of the resultant structures was measured by irradiating light onto the amorphous indium tin oxide film. The results are shown in Table 1 below.

Referring to Table 1, when the amorphous indium tin oxide film is not formed, a reflectivity of more than 95 (see Experiment 1, Experiment 2, and Experiment 3) is obtained when light is irradiated to the aluminium film. However, when the amorphous indium tin oxide film is formed on the aluminium film, a reflectivity of 7 to 8 (see Experiment 4, Experiment 5, Experiment 6, and Experiment 7) is obtained when light is irradiated onto the amorphous indium tin oxide film. That is, the amorphous indium tin oxide film reduces the reflection of light by the aluminium film.

TABLE 1

(Reflectivity before and after deposition of a-ITO)

| Experiment | Gate Deposition (Å) (Al/Mo) | a-ITO (Å) | Reflectivity |
|---|---|---|---|
| 1 | 2500/500 | — | 95.18 |
| 2 | 2500/500 | — | 95.26 |
| 3 | 2500/500 | — | 95.31 |
| 4 | 2500/500 | 350 | 7.22 |
| 5 | 2500/500 | 450 | 7.95 |
| 6 | 2500/500 | 550 | 7.37 |
| 7 | 2500/500 | 650 | 7.35 |

While the present invention has been particularly shown and described with reference to exemplary embodiments thereof, the exemplary embodiments should be considered in a descriptive sense only and not for purposes of limitation. It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A touch screen panel, comprising:
a substrate;
a first gate wiring disposed on the substrate;
a first reflection-preventing film disposed between the substrate and the first gate wiring, the first reflection-preventing film being aligned with the first gate wiring and consisting of an amorphous indium tin oxide (a-ITO) film disposed directly on the substrate;
a sensing wiring disposed on the first gate wiring to be insulated from the first gate wiring and to cross the first gate wiring; and
a semiconductor layer connecting portions of the sensing wiring and configured to be controlled according to a voltage applied to the first gate wiring,
wherein the first reflection-preventing film and the first gate wiring are configured such that external light transmitted through the substrate and reflected by the first reflection-preventing film destructively interferes with external light reflected by the first gate wiring, thereby reducing the amount of light reflected by the first gate wiring, and
wherein the first gate wiring comprises a molybdenum film and aluminum film disposed between the molybdenum film and the a-ITO film.

2. The touch screen panel of claim 1, further comprising a second reflection-preventing film disposed between the substrate and the sensing wiring and aligned with the sensing wiring.

3. The touch screen panel of claim 2, wherein the second reflection-preventing film comprises an amorphous indium tin oxide (a-ITO) film.

4. The touch screen panel of claim 1, further comprising a second gate wiring disposed on the sensing wiring, the second gate wiring being insulated from and crossing the first gate wiring.

5. The touch screen panel of claim 4, further comprising a third reflection-preventing film disposed between the substrate and the second gate wiring and aligned with the second gate wiring.

6. The touch screen panel of claim 5, further comprising a second reflection-preventing film disposed between the substrate and the sensing wiring and aligned with the sensing wiring.

7. The touch screen panel of claim 5, wherein the third reflection-preventing film comprises an amorphous indium tin oxide (a-ITO) film.

8. The touch screen panel of claim 1, wherein:
the first gate wiring is disposed directly on the first reflection-preventing film.

9. A method of manufacturing a touch screen panel, the method comprising:
forming a first reflection-preventing film consisting of an amorphous indium tin oxide (a-ITO) film disposed directly on a substrate;
forming a first gate wiring directly on the first reflection-preventing film, so as to be aligned with the first reflection preventing film, and such that the first reflection-preventing film is disposed between the substrate and the first gate wiring;
forming a sensing wiring on the first gate wiring, the sensing wiring being insulated from the first gate wiring and crossing the first gate wiring; and
forming a second gate wiring on the sensing wiring,
wherein the second gate wiring extends parallel to the sensing wiring, is insulated from the first gate wiring, and crosses the first gate wiring, and
wherein the first reflection-preventing film and the first gate wiring are configured such that external light transmitted through the substrate and reflected by the first reflection-preventing film destructively interferes with external light reflected by the first gate wiring, thereby reducing the amount of light reflected by the first gate wiring, and
wherein the first gate wiring comprises a molybdenum film and aluminum film disposed between the molybdenum film and the a-ITO film.

10. The method of claim 9, further comprising forming a second reflection-preventing film, the second reflection-preventing film being aligned with the sensing wiring.

11. The method of claim 9, further comprising forming a third reflection-preventing film, the third reflection-preventing film being aligned with the second gate wiring.

12. The touch screen panel of claim 1, further comprising:
a gate insulating film disposed on the first gate wiring; and
a semiconductor layer and a light sensing semiconductor layer disposed on the gate insulating layer.

* * * * *